United States Patent
Fujii

(10) Patent No.: US 10,007,252 B2
(45) Date of Patent: Jun. 26, 2018

(54) MACHINE TOOL CONTROLLER

(71) Applicant: FANUC Corporation, Yamanashi (JP)

(72) Inventor: Takaaki Fujii, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 264 days.

(21) Appl. No.: 14/856,753

(22) Filed: Sep. 17, 2015

(65) Prior Publication Data

US 2016/0085231 A1    Mar. 24, 2016

(30) Foreign Application Priority Data

Sep. 24, 2014   (JP) .................... 2014-194105

(51) Int. Cl.
*G05B 19/402* (2006.01)

(52) U.S. Cl.
CPC .. *G05B 19/402* (2013.01); *G05B 2219/35101* (2013.01); *G05B 2219/45145* (2013.01); *G05B 2219/49077* (2013.01); *Y10T 82/2502* (2015.01)

(58) Field of Classification Search
CPC .......... G05B 2219/49077; G05B 2219/35101; G05B 2219/45145; Y10T 82/2502; Y10T 409/303808
USPC .................. 700/159–160, 184–190
See application file for complete search history.

(56) References Cited

U.S. PATENT DOCUMENTS

| 5,920,170 A * | 7/1999 | Seki ..................... G05B 19/409 318/568.15 |
| 2004/0068394 A1 * | 4/2004 | Maekawa .............. B23Q 11/04 702/185 |
| 2004/0174130 A1 | 9/2004 | Inoue et al. |
| 2013/0173045 A1 | 7/2013 | Kawana et al. |
| 2014/0121822 A1 | 5/2014 | Suzuki et al. |

FOREIGN PATENT DOCUMENTS

| CN | 1848011 A | 10/2006 |
| CN | 102608951 A | 7/2012 |
| CN | 103092134 A | 5/2013 |
| CN | 103189807 A | 7/2013 |
| CN | 103785903 A | 5/2014 |
| JP | 60-229113 A | 11/1985 |

(Continued)

OTHER PUBLICATIONS

Office Action in CN Application No. 201510607675.7, dated Mar. 10, 2017.

(Continued)

*Primary Examiner* — Nathan L Laughlin
*Assistant Examiner* — Shon Foley
(74) *Attorney, Agent, or Firm* — Hauptman Ham, LLP

(57) ABSTRACT

A controller controls a machine tool that rotates a cutting tool attached to a spindle to cut a workpiece in accordance with a machining program. The controller identifies, when the machining program is executed to cause the cutting tool to cut into the workpiece, a position where the cutting tool has come into contact with the workpiece for the first time and a machining direction at the time when the cutting tool has cut into the workpiece, and inserts, in the machining program, a roll-in path instruction having an end point set to the identified position at which the cutting tool has come into contact with the workpiece for the first time.

6 Claims, 9 Drawing Sheets

D : CUTTING TOOL DIAMETER
D0 : SAFETY DISTANCE
M : SPINDLE ROTATING DIRECTION
U : ROLL-IN

(56) References Cited

FOREIGN PATENT DOCUMENTS

| | | |
|---|---|---|
| JP | 6-335841 A | 12/1994 |
| JP | 2004-252839 A | 9/2004 |
| JP | 2008-9758 A | 1/2008 |

OTHER PUBLICATIONS

William Durow, "The Modern Art of Milling", Cutting Tool Engineering, Jan. 2011, vol. 63, Issue 1, USA.
Office Action in JP Application No. 2014-194105, dated Dec. 1, 2015.

* cited by examiner

D : CUTTING TOOL DIAMETER:φ 10
D0 : SAFETY DISTANCE: 0.1 mm
M : SPINDLE ROTATING DIRECTION: CLOCKWISE

BEFORE CHANGE (PRO1)

(1) G00 Z0.0
    (MOVE TO Z=0.0 AT HIGH FEED SPEED)

(2) G01 Y-50.0 F100
    (PERFORM MACHINING TO Y=-50.0 AT CUTTING FEED SPEED)

D : CUTTING TOOL DIAMETER:φ 10
D0 : SAFETY DISTANCE: 0.1 mm
M : SPINDLE ROTATING DIRECTION: CLOCKWISE

AFTER CHANGE (PRO2)

(1') G00 Z0.0
   (MOVE TO Z=0.0 AT HIGH FEED SPEED) [NO CHANGE]

(2') G00 X-5.0 Y5.1
   (MOVE TO Y=-50.0 AT CUTTING FEED SPEED) [STEP SB04]

(3') G02 X0.0 Y0.1 J-5.0 F100
   (PERFORM MACHINING TO X=0.0 AND Y=0.1 WITH RADIUS OF 5 mm IN CLOCKWISE ARCUATE INTERPOLATION) [STEP SB05]

(4') G01 Y-50.0 F100
   (PERFORM MACHINING TO Y=-50.0 AT CUTTING FEED SPEED) [NO CHANGE]

D : CUTTING TOOL DIAMETER
D0 : SAFETY DISTANCE
M : SPINDLE ROTATING DIRECTION
U : ROLL-IN

D : CUTTING TOOL DIAMETER
M : SPINDLE ROTATING DIRECTION
Q : SHAFT MOVEMENT

D : CUTTING TOOL DIAMETER
D0 : SAFETY DISTANCE
M : SPINDLE ROTATING DIRECTION

MACHINE TOOL CONTROLLER

RELATED APPLICATIONS

The present application claims priority to Japanese Application Number 2014-194105, filed Sep. 24, 2014, the disclosure of which is hereby incorporated by reference herein in its entirety.

BACKGROUND OF THE INVENTION

Field of the Invention

The present invention relates to control of a machining path in a cutting process using a machine tool, and particularly to a machine tool controller capable of automatically generating, with simple operation, a cut-in machining path called a roll-in path and replacing a cut-portion machining path in a machining program with the roll-in path.

Description of the Related Art

When a machine tool is used to perform cutting in a direction perpendicular to a spindle (milling, see FIG. 8), such as grooving, a large amount of vibration occurs immediately after the cutting starts and undesirably lowers the life of a cutting tool.

A cutting tool 2 for milling is typically formed of a plurality of blades 3, as shown in FIG. 8. Observation of cutting action of one of the blades shows that rotation of the spindle (in a spindle rotating direction M) and movement Q in a direction of an axis perpendicular to the spindle cause the blade 3 to hit a workpiece 4 and produce cut chips.

The blade 3 of the cutting tool 2 hits the workpiece 4 and then goes out of the workpiece 4 because the spindle rotates, but the movement Q of the axis perpendicular to the spindle takes place simultaneously for milling. When the cutting tool 2 cuts into the workpiece 4 linearly, thick cut chips are produced when the cutting tool 2 goes out of the workpiece 4 until the cutting tool 2 cuts into the workpiece 4 by a distance corresponding to the radius of the cutting tool 2 (one-half the cutting tool diameter D). Since the cutting tool 2 produces thick cut chips immediately after the cutting tool 2 cuts into the workpiece 4, a large amount of vibration occurs when the cutting tool 2 goes out of the workpiece 4 and undesirably lowers the life of the cutting tool.

To solve the problem, there is a generally known method using a cut-in machining path called a roll-in path shown in FIG. 9. The roll-in path refers to a cutting tool path along which the cutting tool 2 cuts into the workpiece 4 in a milling process and enters the workpiece 4 while drawing an arc 8 in such a way that a cut chip exit position 7 is close to a location where an end surface 6 of the workpiece 4 intersects a machined groove width line 5 until the cutting tool 2 cuts into the workpiece 4 by a distance corresponding to the radius of the cutting tool 2 (one-half of the cutting tool diameter D). Using the roll-in cutting tool path allows the cutting tool 2 to cut in the workpiece 4 with cut chips maintained thin when the cutting tool 2 goes out of the workpiece 4. It can therefore be said that the roll-in cutting tool path is a machine-friendly machining path along which a small amount of load acts on the cutting tool 2 because the cutting tool 2 can cut into the workpiece 4 with cut chips maintained thin when the cutting tool 2 goes out of the workpiece 4.

However, calculating a machining start position where the roll-in path starts, for a machining program that has been inputted to a controller that controls a machine tool, or when the machining program is created, and reflecting an arcuate cut-in start path in the machining program is a cumbersome task. A machining method which uses a cut-in-portion machining path called a roll-in path has not become wide use in a market.

On the other hand, a technology for preventing breakage of a cutting tool in a machine tool is disclosed, for example, in Japanese Patent Application Laid-open No. 2004-252839. The technology involves detection of a load acting on the spindle that rotates a cutting tool or a load acting on a cutting tool feed shaft and prevention of breakage of the cutting tool in accordance with the magnitude of the detected load.

SUMMARY OF THE INVENTION

An object of the invention is to provide a machine tool controller capable of automatically generating with simple operation a cut-in machining path called a roll-in path and replacing a cut-in-portion machining path in a machining program with the roll-in path.

A machine tool controller according to the present invention controls a machine tool that has a spindle and at least two feed shafts that move a workpiece relative to the spindle in directions perpendicular to the spindle and rotates a cutting tool attached to the spindle to cut the workpiece in accordance with a machining program.

A first aspect of the machine tool controller according to the present invention includes: a position/direction identification unit that identifies, when the machining program is executed to cause the cutting tool to cut into the workpiece, a position where the cutting tool has come into contact with the workpiece for the first time and a machining direction at the time when the cutting tool has cut into the workpiece; and a movement path correction unit that inserts, in the machining program, a roll-in path instruction having an end point set to the position at which the cutting tool has come into contact with the workpiece for the first time, identified by the position/direction identification unit.

A second aspect of the machine tool controller according to the present invention includes: a cutting load value storage unit that stores a cutting load value at regular time intervals during the execution of a cutting instruction in the machining program; a machining information storage unit that stores, at regular time intervals, machining information during the cutting in which coordinate values of each of the axes are contained; a cutting end position storage unit that stores, as cutting end position, the coordinate values of each of the axes when the cutting load value stored in the cutting load value storage unit exceeds a predetermined threshold, in consideration of a predetermined cutting tool diameter; and a movement path correction unit that inserts, in a position before a cutting instruction block for cutting start in the machining program, an arcuate interpolation instruction having a preset radius of curvature and having an end point that coincides with the cutting end position, and also a linear interpolation instruction that connects a start point of the cutting instruction block and a start point of the arcuate interpolation instruction.

The machine tool controller described above may further include interruption unit configured to interrupt the execution of the machining program when the cutting end position storage unit stores a cutting end position.

The present invention can provide a machine tool controller capable of automatically generating with simple operation a cut-in machining path called a roll-in path and replacing a cut-in-portion machining path in a machining program with the roll-in path.

BRIEF DESCRIPTION OF THE DRAWINGS

The object and feature of the present invention described above and other objects and features thereof will be apparent from the following description of an embodiment with reference to the accompanying drawings.

DETAILED DESCRIPTION OF THE PREFERRED EMBODIMENT

Figure 1:
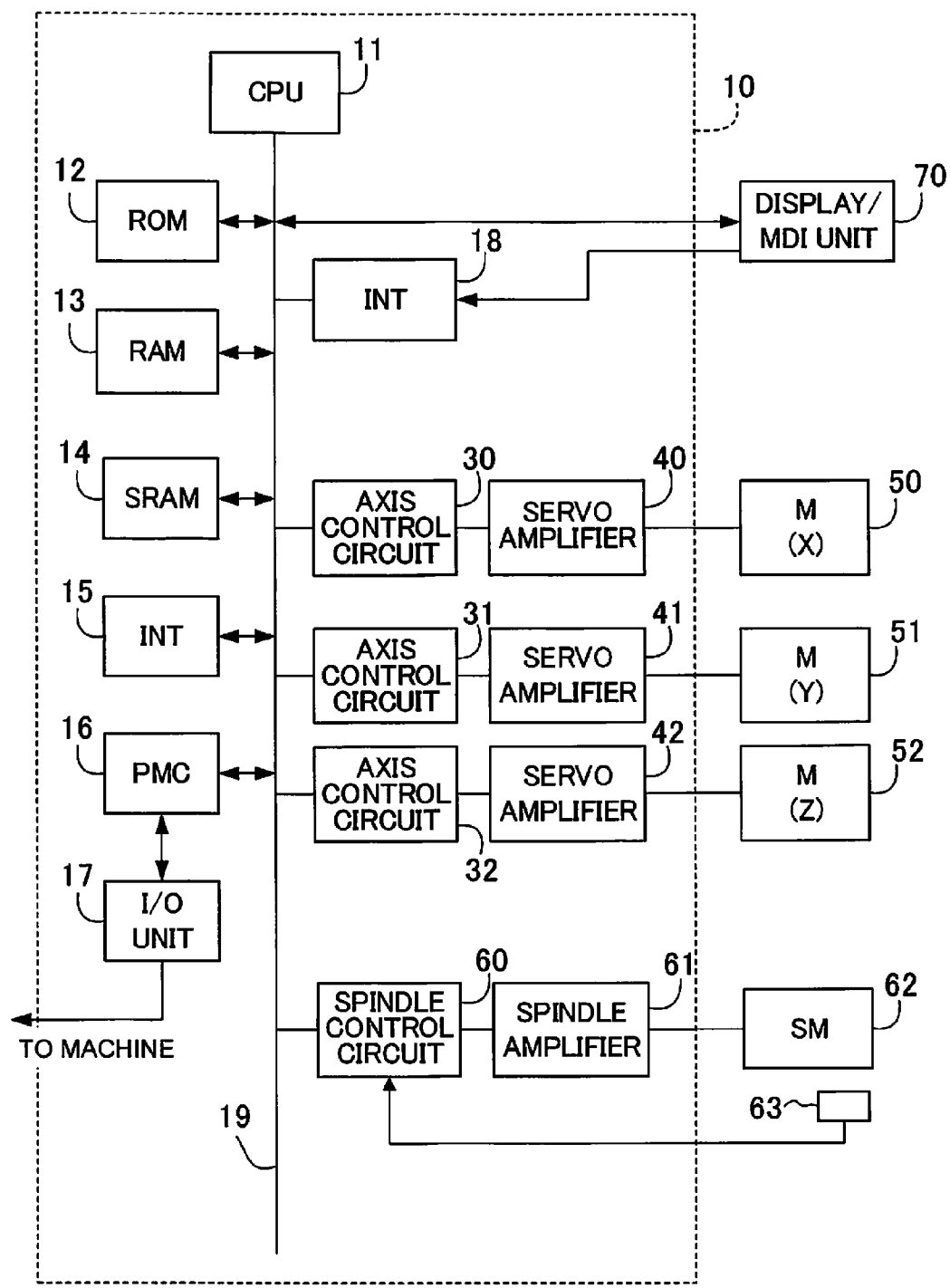
FIG. 1 is a block diagram of key portions of an embodiment of a machine tool controller (numerical controller) according to the present invention.

An embodiment of a machine tool controller (numerical controller) according to the present invention will be described with reference to FIG. 1.

A CPU 11 is a processor that controls a numerical controller 10 as a whole, and the CPU 11 reads a system program stored in a ROM 11 via a bus 19 and controls the entire numerical controller 10 in accordance with the read system program. A RAM 13 stores temporary calculation data and display data and a variety of data inputted by an operator via a display/MDI unit 70.

An SRAM memory 14 is formed of a nonvolatile memory that maintains a stored state even when the numerical controller 10 is powered off. An interface 15 allows connection to an external apparatus (not shown) from which a machining program and other programs and a variety of data are inputted. The SRAM memory 14 stores the machining program read via the interface 15, a machining program inputted via the display/MDI unit 70, or a machining program otherwise inputted to the numerical controller 10. A variety of system programs for carrying out an editing mode process necessary for creation and editing of the machining program and an automatic operation process are loaded in the ROM 12 in advance. A load monitoring program is also stored in the ROM 12.

A PMC (programmable machine controller) 16 outputs a signal via an I/O unit 17 to an auxiliary apparatus of a machine tool (for example, cutting tool exchanging robot hand or any other actuator) by using a sequence program built in the numerical controller 10 to control the auxiliary apparatus. Further, the PMC 16 receives signals from a variety of switches and other components on an operation board (not shown) provided on a main body of the machine tool, performs necessary signal processing, and then forwards the processed signals to the CPU 11.

Axis control circuits 30 to 32 associated with the axes receive axis movement instructions from the CPU 11 and output instructions associated with the axes to servo amplifiers 40 to 42. Having received the instructions, the servo amplifiers 40 to 42 drive servo motors 50 to 52 associated with the axes. The servo motors 50 to 52 associated with the axes each accommodate a position/speed detector, feed back a position/speed feedback signal from the position/speed detector to the axis control circuits 30 to 32, which then perform position/speed feedback control. Based on the position/speed feedback signals, information on the positions of the feed shafts can be acquired intermittently (at predetermined cycle). In FIG. 1, illustration of the position/speed feedback is omitted. The servo motors 50, 51, and 52 drive X, Y, and Z axes of the machine tool.

A spindle control circuit 60 receives a spindle rotation instruction and outputs a spindle speed signal to a spindle amplifier 61. The spindle amplifier 61 receives the spindle speed signal and rotates a spindle motor (SM) 62 at an instructed rotating speed. The rotating speed of the spindle motor 62 detected by a speed detector 63 is fed back to the spindle control circuit 60 and used to control the speed of the spindle motor 62.

The spindle control circuit 60, which controls the spindle motor 62, is provided with a disturbance estimation observer, and the observer detects a load torque (load value) acting on the spindle motor. The observer is not, however, necessarily provided, and a load torque acting on the spindle motor 62 may instead be detected based simply on drive current flowing through the spindle motor 62. Still instead, a torque sensor may specially be added to measure the load torque.

In the embodiment described above, the load torque acting on the spindle motor (SM) is measured to determine a cutting load (spindle load value). Instead, a load torque acting on each of the servo motors 50, 51, and 52 associated with the X, Y, and Z cutting tool feed shafts may be measured to measure a cutting load (feed shaft load value). In this case, a disturbance estimation observer is incorporated in each of the axis control circuits 30, 31, and 32, which drive and control the servo motors 50, 51, and 52 associated with the X, Y, and Z cutting tool feed shafts to measure the load torque acting on the motor.

Instead, drive current flowing through each of the servo motors may simply be measured, and the load torque may be estimated based on the measured drive current. Further, a torque sensor may be added to measure the load torque acting on the servo motor associated with the corresponding one of the axes. The measured load torques acting on the servo motors 50, 51, and 52 associated with the X, Y, and Z cutting tool feed shafts may be combined with one another to determine a combined load torque and set it as a cutting load torque.

The configuration of the numerical controller 10 described above has no difference from the configuration of conventional numerical controllers, and the thus configured numerical controller 10 drives and controls a three-axis machining apparatus. A processor (CPU) 100 of the numerical controller 10 executes software that automatically generates, with simple operation, a cut-in machining path called a roll-in path according to the present invention and described later and replaces a cut-in-portion machining path in a machining program with the roll-in path. When a machine tool is provided with two feed shafts (X and Y axes, for example) that move the spindle and a workpiece relative to each other in directions perpendicular to the spindle, machining along the roll-in path can be performed.

Figure 2:
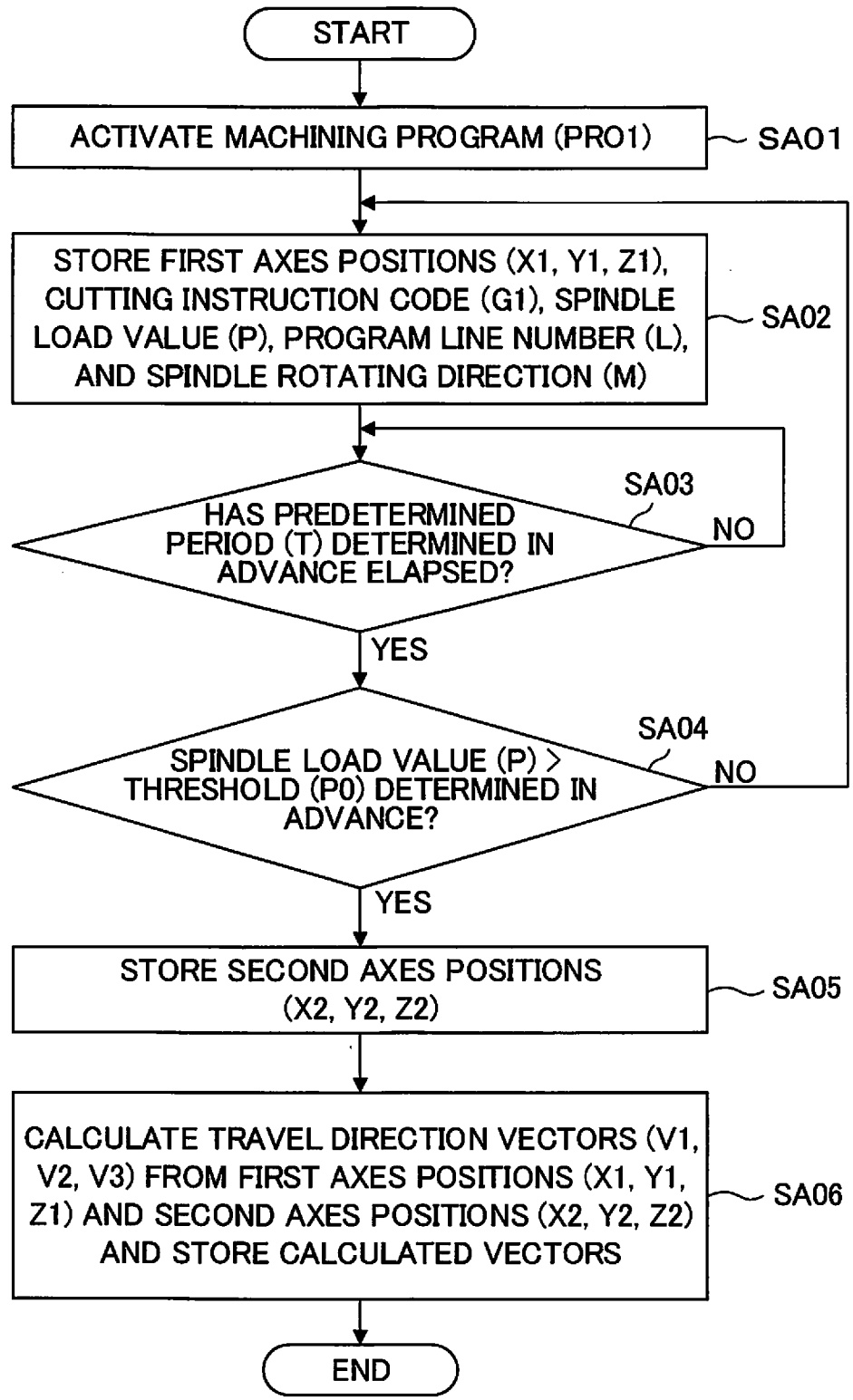
FIG. 2 is a flowchart showing the procedure of processes of identifying a cutting start position (position where cutting tool has come into contact with workpiece) and a machining direction.

<1> Information Acquisition Means for Acquiring Information on Cutting Start Position (Position where Cutting Tool has Come into Contact with Workpiece), Machining Direction, and Other Parameters FIG. 2 is a flowchart showing the procedure of processes of identifying a cutting start position (position where cutting tool has come into contact with workpiece) and a machining direction.

To automatically replace a cut-in-portion machining path in an existing machining program with a roll-in machining path, it is first necessary to acquire information necessary for the replacement. A method for acquiring the information will be described on a step basis.

[Step SA01] A machining program (PRO1) is activated.

[Step SA02] First axes positions (X1, Y1, Z1), a cutting instruction code (G), a spindle load value (P), the program line number (L), and a spindle rotating direction (M) are simultaneously stored in a memory in the controller.

[Step SA03] It is determined whether a predetermined period (T) determined in advance has elapsed or not. When the period has not elapsed, and if the predetermined period has not yet elapsed, the process waits until the period elapses, whereas when the period has elapsed, the process proceeds to step SA03.

[Step SA04] it is determined whether or not the stored spindle load value (P) is greater than a threshold (P0) determined in advance. When the spindle load value (P) is not greater than the threshold (P0), the process returns to step SA02, whereas when the spindle load value (P) is greater than the threshold (P0), the process determines that the cutting tool has come into contact with the workpiece and proceeds to step SA05.

The spindle load value (P) may be replaced with the value of a load acting on the feed shaft along which the cutting tool travels.

The process in step SA04 causes the first axes positions (X1, Y1, Z1), the cutting instruction code (G), the spindle load value (P), the L-th line in the program (L), and the spindle rotating direction (M) to be stored in the memory in the controller whenever the predetermined period (T) determined in advance elapses until the cutting tool comes into contact with the workpiece.

Setting the predetermined threshold (P0) to a spindle load value acting on the spindle in an unloaded condition where only the spindle rotates would prevents wrong evaluation.

[Step SA05] Second axes positions (X2, Y2, Z2) are stored (as cutting start positions) in the memory in the controller. Since the second axes positions (X2, Y2, Z2) are stored after the predetermined period (T) elapses, at least one of the second axes positions (X2, Y2, Z2) differs from the corresponding one of the first axes positions (X1, Y1, Z1).

[Step SA06] Cutting tool traveling direction vectors (V1, V2, V3) are derived from the first axes positions (X1, Y1, Z1) and the second axes positions (X2, Y2, Z2) stored in the memory and the vectors are stored in the memory in the controller.

Carrying out the processes in the flowchart shown in FIG. 2 allows the information necessary for creation of a roll-in machining path at the time of cutting-in (cutting start position and machining direction) to be stored in the memory in the machine tool controller.

Figure 3:
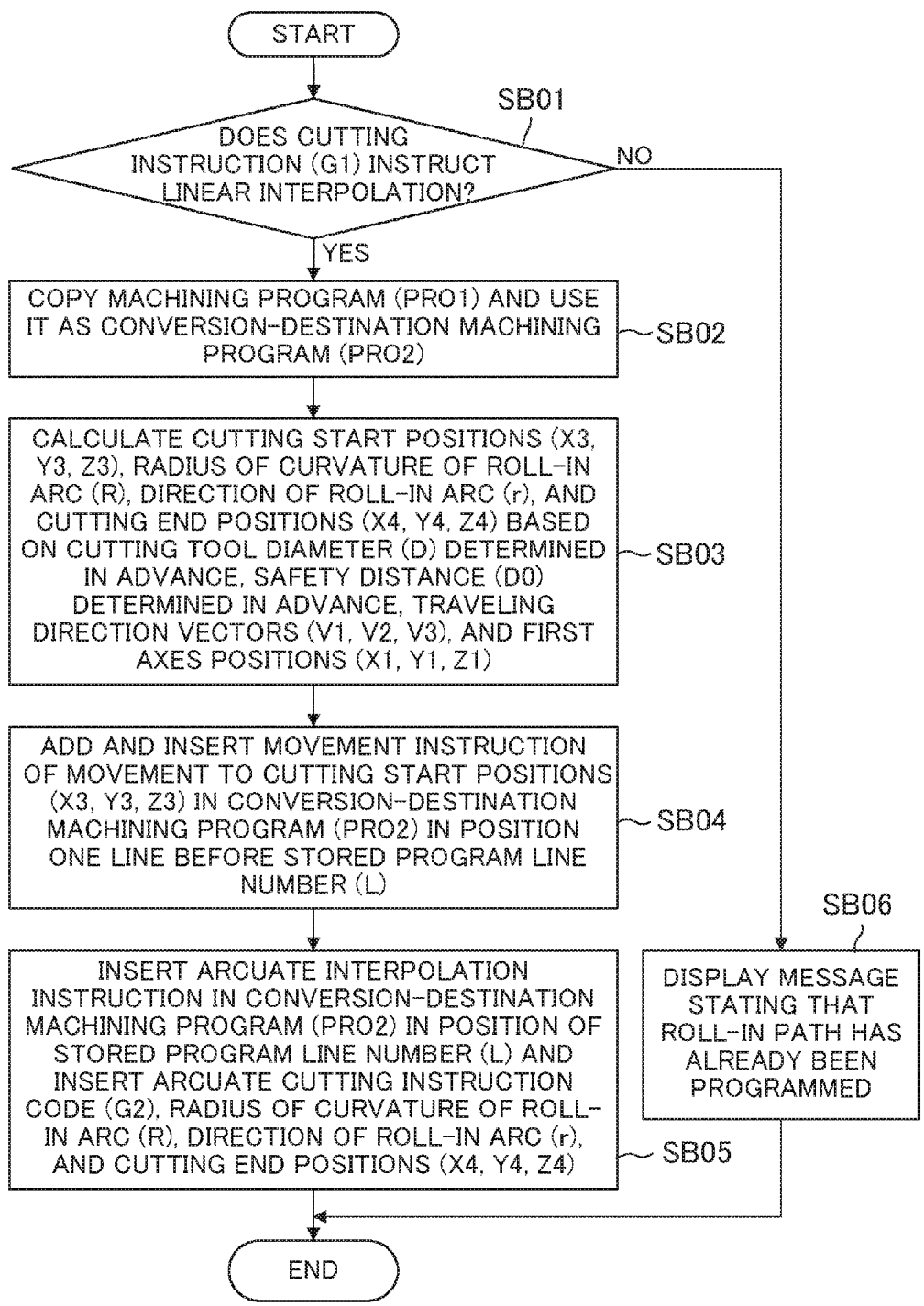
FIG. 3 is a flowchart showing the procedure of processes of replacing a G code for a cutting start portion.

<2> Means for Replacing Cut-in-Portion Machining Path with Roll-in Machining Path FIG. 3 is a flowchart showing the procedure of processes of replacing the G code for the cutting start portion.

The processes of replacing the cut-in-portion machining path will be described below in detail based on the information acquired in the processes in the flowchart of FIG. 2.

[Step SB01] When the cutting instruction code (G) stored in the memory instructs linear interpolation, the process proceeds to the subsequent step SB02, whereas when the cutting instruction code (G) instructs arcuate interpolation, the process proceeds to step SB06.

[Step SB02] When the cutting instruction code (G) instructs linear interpolation, the machining program (PRO1) is duplicated in conversion-destination machining program (PRO2). The reason for duplicating the machining program (PRO1) is to maintain the machining program (PRO1) unchanged. However, in a case where the machining program (PRO1) may be entirely replaced with the machining program (PRO2) (that is, in a case where the original machining program 01 needs not remain unchanged), the process in step SB02 is not required.

[Step SB03] Cutting start positions (X3, Y3, Z3), the radius of curvature of a roll-in arc (R), the direction of the roll-in arc (r), and arcuate interpolation end positions (X4, Y4, Z4) are calculated by using a cutting tool diameter (D) and a safety distance (D0) that are determined in advance, the traveling direction vectors (V1, V2, V3), the first axes positions (X1, Y1, Z1), and the spindle rotating direction (M) that are stored in the memory.

The cutting start positions (X3, Y3, Z3) are calculated as positions shifted from the first axes positions (X1, Y1, Z1) by the safety distance (D0) determined in advance in the directions opposite those of the traveling direction vectors (V1, V2, V3).

A position separate from the position where the cutting tool has come into contact with the workpiece (first axes positions) by the safety distance (D0) determined in advance can thus be determined.

The radius of curvature of a roll-in arc (R) is set at a value obtained by adding the safety distance (D0) determined in advance to one-half the cutting tool diameter (D) determined in advance (R=D/2+D0). An arc can be drawn around a point in the vicinity of the intersection of the end surface of the workpiece and a cut groove width line (see FIG. 7).

In this process, the closer the safety distance (D0) determined in advance is to zero, the thinner chips produced when the cutting tool goes out of the workpiece are.

The roll-in direction (r) is set to coincide with the spindle rotating direction (M). Setting the roll-in direction (r) to be opposite the spindle rotating direction (M) conversely increases the thickness of chips produced when the cutting tool goes out of the workpiece, which means that caution needs to be taken.

The cutting end positions (X4, Y4, Z4) are set to be positions ahead of the positions separate from the first axes positions (X1, Y1, Z1) by the safety distance (D0) determined in advance by one-half the cutting tool diameter (D) determined in advance in the directions of the traveling direction vectors (V1, V2, V3).

The start position, the end position, the radius of the arc, and the arcuate interpolation direction of the arcuate interpolation can thus be determined.

[Step SB04] An axis movement instruction to the cutting start positions (X3, Y3, Z3) is added in the position one line before the L-th line (the value 'L' is stored) in the conversion-destination machining program (PRO2).

[Step SB05] An arcuate interpolation instruction is added in the position of the L-th line (L) in the conversion-destination machining program (PRO2), and the radius of curvature of the roll-in arc (R), the roll-in direction (r), and the cutting end positions (X4, Y4, Z4) are inserted as arcuate interpolation parameters. The initial linear interpolation instruction remains in the L-th line (L) in the program, and the arcuate interpolation is followed by the linear interpolation until the initial end point is reached.

After the steps described above, a program in which the cut-in machining path has been replaced with the roll-in path is generated in the conversion-destination machining program (PRO2).

[Step SB06] When the cutting instruction code (G1) instructs arcuate interpolation, a message "Roll-in path has been already programmed" is displayed, for example, on a monitor on the controller, and the replacement process is interrupted and terminated.

<3> Cutting-Start-Portion Machining Path Before and after Change

Figure 4:
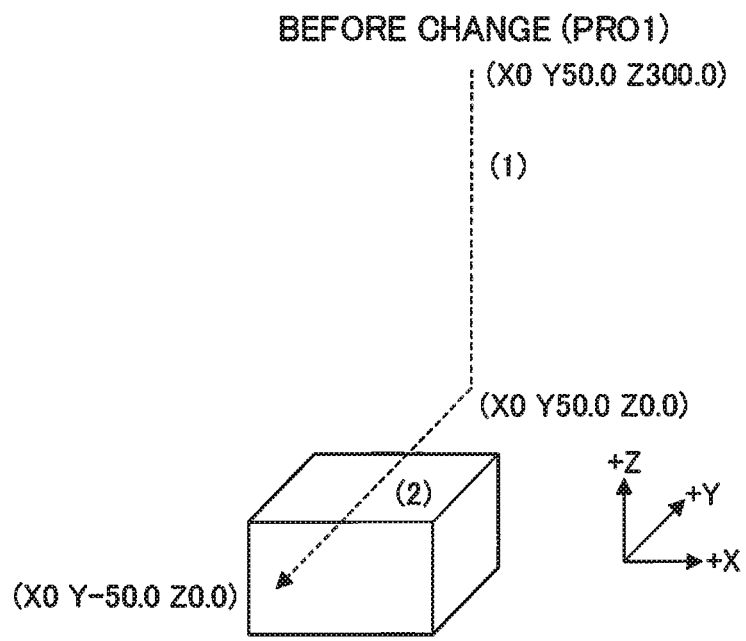
FIG. 4 shows a cutting-start-portion machining path created by a machining program before a change.
Figure 5:
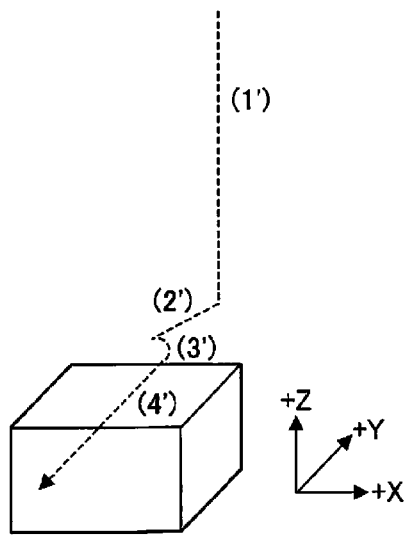
FIG. 5 shows a cutting-start-portion machining path created by a machining program after a change made by a method according to the present invention.
Figure 6:
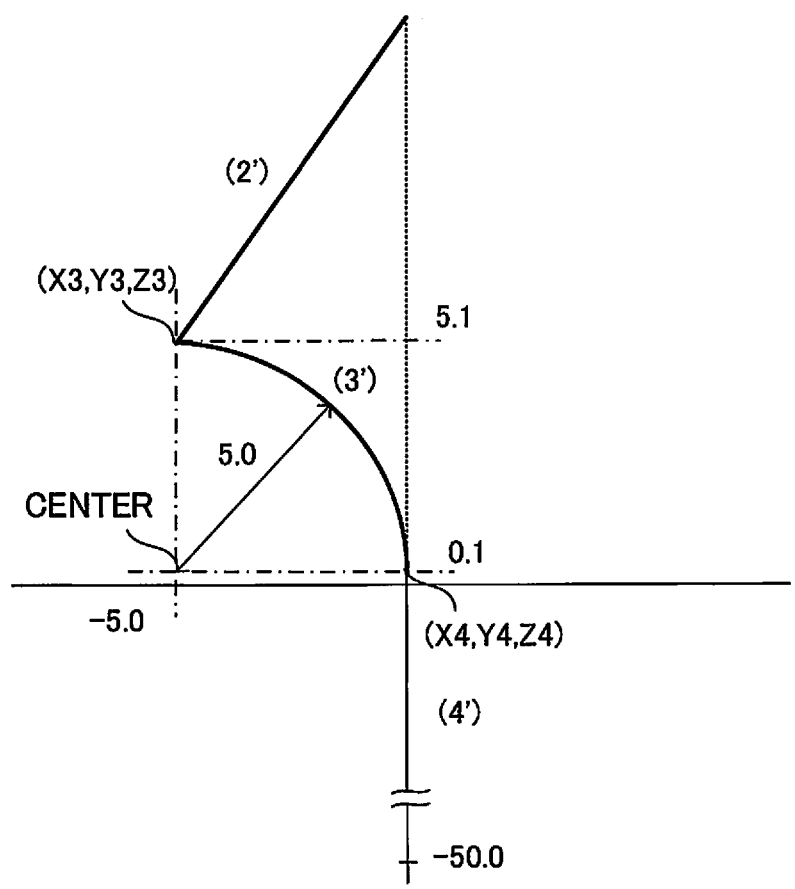
FIG. 6 shows the cutting-start-portion machining path after the change in an XY plane in FIG. 5.

FIG. 4 shows a cutting-start-portion machining path created by a machining program before the change. FIG. 5 shows a cutting-start-portion machining path created by a machining program after the change made by the method according to the present invention. FIG. 6 shows the cutting-start-portion machining path after the change in an XY plane in FIG. 5.

The cut-in-portion machining path described with reference to the flowchart of FIG. 3 will be described below in detail in a case where the machining program before the change is used (FIG. 4) and in a case where the machining program after the change according to the present invention is used (FIG. 5).

As an example, the cutting tool diameter (D) is set at 10.0 mm, the safety distance (D0) is set at 0.1 mm, and the spindle rotating direction (M) is set to be clockwise.

The program (PRO1) before the change is a simple program that causes only the following action to be performed: (1) the cut-in-portion machining path is positioned in the Z direction, as shown in FIG. 4; and (2) cutting is performed in the Y direction. The machining path until the cutting tool comes into contact with the workpiece (determined in step SA04) is (2) as illustrated in FIG. 4.

In contrast, in the program after the change (PRO2), An axis movement instruction (2') to the cutting start positions (X3, Y3, Z3) is added to the position one line before instruction (2) in the program before the change (PRO1), as shown in FIG. 5 (step SB04).

Thereafter, in the program after the change (PRO2), an arcuate interpolation instruction is added to the line of instruction (2) (see FIG. 4) in the program before the change (PRO1), and the radius of curvature of a roll-in arc (R), the direction of the roll-in arc (r), and the cutting end positions (X4, Y4, Z4) are inserted as arcuate interpolation parameters (3') (step SB05).

In the program after the change (PRO2), the line of instruction (2) in the program before the change (PRO1) is left unchanged as (4').

Figure 7:
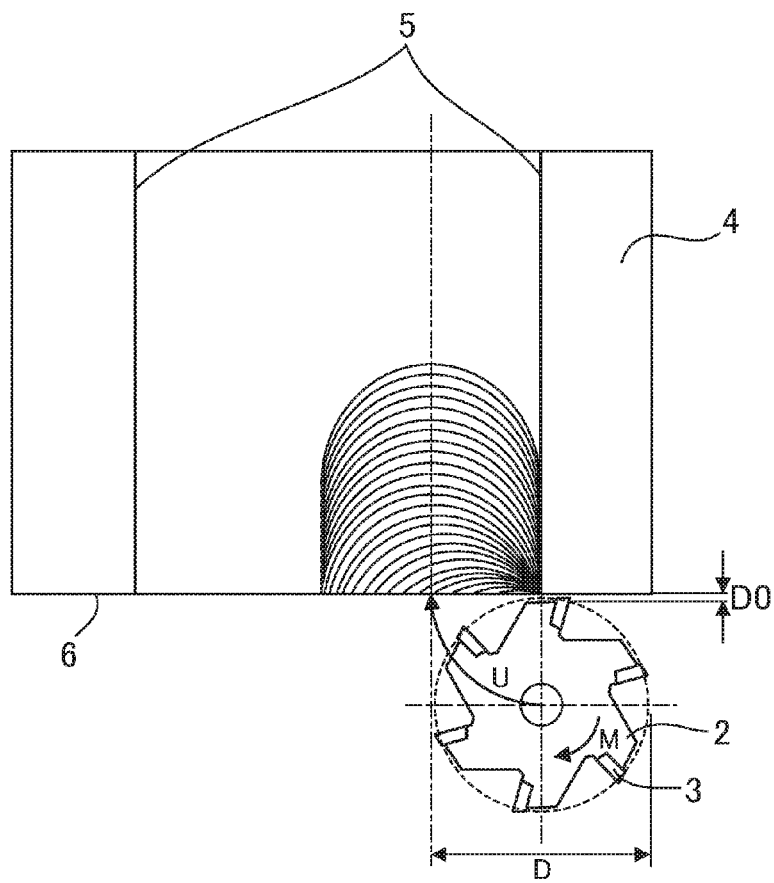
FIG. 7 shows a roll-in machining method in a case where the width of a machined groove is greater than the diameter of a cutting tool.
Figure 8:
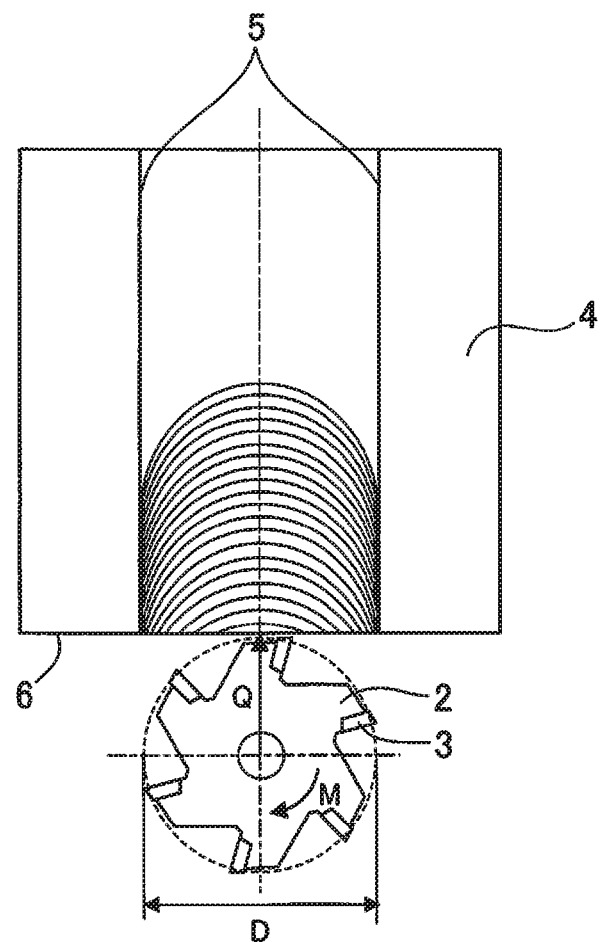
FIG. 8 is an explanatory drawing of milling.
Figure 9:
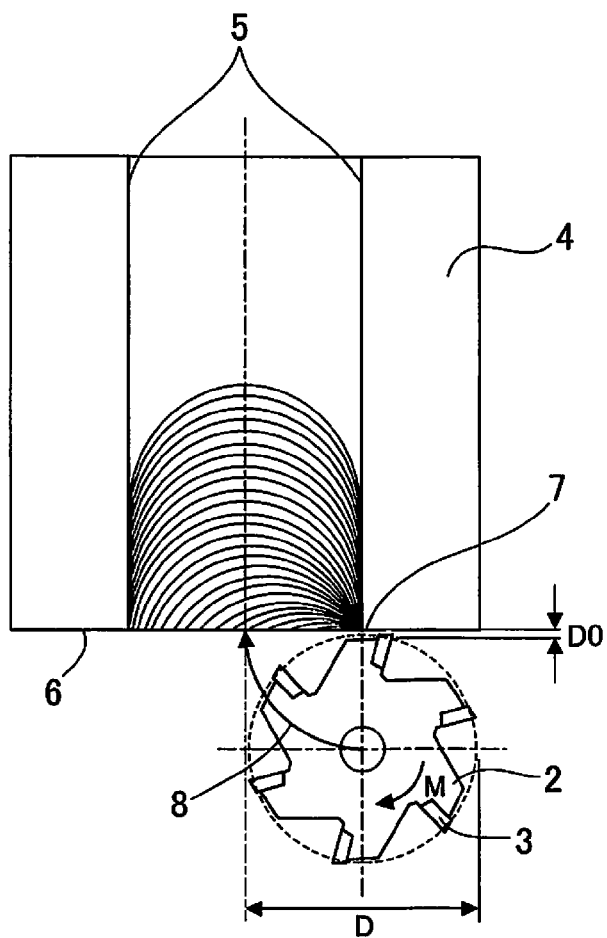
FIG. 9 is an explanatory drawing of a roll-in machining method.

FIG. 7 shows a roll-in machining method in a case where the width of a machined groove (distance between one machined groove width line 5 and the other machined groove width line 5) is greater than the cutting tool diameter (D).

The roll-in machining method according to the present invention is also applicable to a case where the cutting tool diameter D of the cutting tool 2 is smaller than the width of a groove machined in the workpiece 4, as shown in FIG. 7. In this case, the machining is first performed along one of the machined groove width lines 5. In the machining along the one machined groove width line 5, the roll-in machining path described above can be used.

The processes shown in the flowchart of FIG. 2 will now be supplementarily described.

The processes shown in the flowchart of FIG. 2 are carried out concurrently with the execution of the machining program and hence actual machining of the workpiece. The machining first performed on the workpiece is therefore machining along a machining path created by the machining program before the change. To allow the machining to be performed first to be performed according to the machining program that has been so converted that it includes the roll-in machining path, interruption processing may be included in the procedure of the flowchart of FIG. 2 so that the machining of the workpiece is interrupted when it is determined that the cutting tool has come into contact with the workpiece (at the point of time when the determination result in step SA04 becomes YES).

According to the present invention described above, in milling in which cutting is performed in a direction perpendicular to the spindle, such as grooving, programming for performing arcuate interpolation of a cut-in machining path called a roll-in path can be automated, whereby it is expected that the life of the cutting tool is desirably extended.

Further, since the controller according to the present invention automatically calculates a roll-in machining path by using an existing machining program, an operator of the machine does not need to calculate particularly the cutting start position, the radius of curvature of an arc, or other parameters, whereby work of cumbersome programming, which is a cause that prevents the roll-in machining method from becoming wide use in a market, can be avoided.

The invention claimed is:

1. A controller configured to control a machine tool that has a spindle and at least two feed shafts to move a workpiece relative to the spindle in directions perpendicular to the spindle and to rotate a cutting tool attached to the spindle to cut the workpiece in accordance with a machining program, the controller comprising:
  a processor configured to
    identify, when the machining program is executed to cause the cutting tool to cut into the workpiece, a position where the cutting tool has come into contact with the workpiece for the first time, and a machining direction at the time when the cutting tool has cut into the workpiece,
    insert, in the machining program, a roll-in path instruction corresponding to a roll-in path having an end point set to the identified position at which the cutting tool has come into contact with the workpiece for the first time, and
    control the machine tool to cut workpieces in accordance with the machining program having the inserted roll-in path instruction; and
  a storage device that stores
    a cutting load value at regular time intervals during execution of a cutting instruction in the machining program, and
    at regular time intervals during the cutting, machining information in which coordinate values of each of the axes are contained,
  wherein the processor is further configured to
    calculate a cutting end position, as the position where the cutting tool has come into contact with the workpiece for the first time, by using the coordinate values of each of the axes when the stored cutting load value exceeds a predetermined threshold, a predetermined cutting tool diameter, and the identified machining direction, and
    insert, in a position before a cutting instruction block for cutting start in the machining program, an arcuate interpolation instruction having a preset radius of curvature and having an end point that coincides with the cutting end position, as the roll-in path instruction, and also a linear interpolation instruction that connects a start point of the cutting instruction block and a start point of the arcuate interpolation instruction.

2. The controller according to claim 1, wherein the processor is further configured to interrupt the execution of the machining program when the storage device stores the cutting end position.

3. A controller configured to control a machine tool that has a spindle and at least two feed shafts to move a workpiece relative to the spindle in directions perpendicular to the spindle and to rotate a cutting tool attached to the spindle to cut the workpiece in accordance with a machining program, the controller comprising:
a processor configured to
identify, when the machining program is executed to cause the cutting tool to cut into the workpiece, a position where the cutting tool has come into contact with the workpiece for the first time, and a machining direction at the time when the cutting tool has cut into the workpiece,
insert, in the machining program, a roll-in path instruction corresponding to a roll-in path having an end point set to the identified position at which the cutting tool has come into contact with the workpiece for the first time, and
control the machine tool to cut workpieces in accordance with the machining program having the inserted roll-in path instruction,
wherein the processor is configured to insert, in the machining program,
in a position before a cutting instruction block for cutting start in the machining program, the roll-in path instruction as an arcuate interpolation instruction having
a preset radius of curvature, and
an end point that coincides with the position where the cutting tool has come into contact with the workpiece for the first time, and
a linear interpolation instruction that connects a start point of the cutting instruction block and a start point of the arcuate interpolation instruction.

4. A machine tool, comprising:
a spindle and at least two feed shafts to move a workpiece relative to the spindle in directions perpendicular to the spindle and to rotate a cutting tool attached to the spindle to cut the workpiece in accordance with a machining program; and
a controller comprising a processor configured to
identify, when the machining program is executed to cause the cutting tool to cut into the workpiece, a position where the cutting tool has come into contact with the workpiece for the first time, and a machining direction at the time when the cutting tool has cut into the workpiece,
insert, in the machining program, a roll-in path instruction having an end point set to the identified position at which the cutting tool has come into contact with the workpiece for the first time, and
control the machine tool to cut workpieces in accordance with the machining program having the inserted roll-in path instruction
wherein the controller further comprises a storage device that stores
a cutting load value at regular time intervals during execution of a cutting instruction in the machining program, and
at regular time intervals during the cutting, machining information in which coordinate values of each of the axes are contained, and
the processor is further configured to
calculate a cutting end position, as the position where the cutting tool has come into contact with the workpiece for the first time, by using the coordinate values of each of the axes when the stored cutting load value exceeds a predetermined threshold, a predetermined cutting tool diameter, and the identified machining direction, and
insert, in a position before a cutting instruction block for cutting start in the machining program, an arcuate interpolation instruction having a preset radius of curvature and having an end point that coincides with the cutting end position, as the roll-in path instruction, and also a linear interpolation instruction that connects a start point of the cutting instruction block and a start point of the arcuate interpolation instruction.

5. The machine tool according to claim 4, wherein the processor is further configured to interrupt the execution of the machining program when the storage device stores the cutting end position.

6. A machine tool, comprising:
a spindle and at least two feed shafts to move a workpiece relative to the spindle in directions perpendicular to the spindle and to rotate a cutting tool attached to the spindle to cut the workpiece in accordance with a machining program; and
a controller comprising a processor configured to
identify, when the machining program is executed to cause the cutting tool to cut into the workpiece, a position where the cutting tool has come into contact with the workpiece for the first time, and a machining direction at the time when the cutting tool has cut into the workpiece,
insert, in the machining program, a roll-in path instruction having an end point set to the identified position at which the cutting tool has come into contact with the workpiece for the first time, and
control the machine tool to cut workpieces in accordance with the machining program having the inserted roll-in path instruction,
wherein the processor is configured to insert, in the machining program,
in a position before a cutting instruction block for cutting start in the machining program, the roll-in path instruction as an arcuate interpolation instruction having
a preset radius of curvature, and
an end point that coincides with the position where the cutting tool has come into contact with the workpiece for the first time, and
a linear interpolation instruction that connects a start point of the cutting instruction block and a start point of the arcuate interpolation instruction.

* * * * *